(12) United States Patent
Chao et al.

(10) Patent No.: US 10,416,980 B2
(45) Date of Patent: Sep. 17, 2019

(54) INTELLIGENT LOCATION BASED SERVICES AND NAVIGATION HYBRID SYSTEM

(75) Inventors: Yi-Chung Chao, Fremont, CA (US); Robert Rennard, Gilroy, CA (US); HaiPing Jin, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 3506 days.

(21) Appl. No.: 11/323,850

(22) Filed: Dec. 30, 2005

(65) Prior Publication Data
US 2007/0168524 A1    Jul. 19, 2007

(51) Int. Cl.
*G06F 15/16* (2006.01)
*G06F 8/65* (2018.01)

(52) U.S. Cl.
CPC ................................. *G06F 8/65* (2013.01)

(58) Field of Classification Search
CPC .......... H04W 4/046; H04W 4/025; G06F 8/65
USPC .................. 709/229; 701/23–26; 342/357.09
See application file for complete search history.

(56) References Cited

U.S. PATENT DOCUMENTS

| | | | |
|---|---|---|---|
| 6,343,317 B1 * | 1/2002 | Glorikian ..................... 709/218 |
| 6,377,210 B1 * | 4/2002 | Moore ..................... 342/357.13 |
| 6,414,629 B1 * | 7/2002 | Curcio ..................... 342/357.52 |
| 6,545,637 B1 * | 4/2003 | Krull et al. .............. 342/357.09 |
| 6,553,310 B1 * | 4/2003 | Lopke ......................... 701/213 |
| 6,597,906 B1 * | 7/2003 | Van Leeuwen ......... H04W 4/02 455/422.1 |
| 6,625,135 B1 * | 9/2003 | Johnson et al. .............. 370/332 |
| 6,823,255 B2 * | 11/2004 | Ahrens et al. ................ 701/200 |
| 6,845,241 B2 | 1/2005 | Edlund et al. |
| 6,853,911 B1 * | 2/2005 | Sakarya .................. G01C 21/32 701/455 |
| 6,912,398 B1 | 6/2005 | Domnitz |
| 6,968,272 B2 * | 11/2005 | Knockeart et al. ........... 701/210 |
| 6,978,206 B1 * | 12/2005 | Pu .......................... G01C 21/26 701/410 |
| 7,071,842 B1 * | 7/2006 | Brady, Jr. ..................... 340/988 |
| 7,266,376 B2 * | 9/2007 | Nakagawa ................ 455/456.1 |
| 7,304,606 B2 * | 12/2007 | Pande et al. ............. 342/357.09 |

(Continued)

FOREIGN PATENT DOCUMENTS

JP    2001084269 A  *  9/1999  .............. G06F 11/30

OTHER PUBLICATIONS

T. Abdelazim, W. Abdel-Hamid, N. El-Sheimy, E.H. Shin, "Experimental Results of an Adaptive Fuzzy Network Kalman Filtering Integration for Low Cost Navigation Applications", 2004 Annual Meeting of the North American Fuzzy Information Processing Society, Banff, Alta., Canada, Jun. 27-30, 2004.*

(Continued)

*Primary Examiner* — Yin Chen Shaw
*Assistant Examiner* — Darshan I Dhruv
(74) *Attorney, Agent, or Firm* — Perspectives Law Group, Corp.

(57) ABSTRACT

An intelligent location based services and navigation hybrid system comprising a client having location based service capability and a server, the system setting a condition for new or updates of a relevant information by the server and/or client, selecting the relevant information for the updates by the server, transmitting the relevant information from the server, receiving the updates of the relevant information by the client, and selecting an operational mode by the client.

20 Claims, 4 Drawing Sheets

(56) References Cited

U.S. PATENT DOCUMENTS

| | | | |
|---|---|---|---|
| 7,522,992 B2* | 4/2009 | Obradovich et al. | 701/200 |
| 7,606,579 B2* | 10/2009 | Thacher | 455/456.1 |
| 2001/0016488 A1* | 8/2001 | Haymes | H04W 24/00 455/423 |
| 2001/0040627 A1* | 11/2001 | Obradovich | G08G 1/096716 348/222.1 |
| 2002/0029108 A1* | 3/2002 | Liu | G01C 21/26 701/410 |
| 2002/0051011 A1 | 5/2002 | Goto | |
| 2002/0061741 A1* | 5/2002 | Leung et al. | 455/414 |
| 2002/0120394 A1* | 8/2002 | Rayne | 701/207 |
| 2002/0131393 A1* | 9/2002 | Baldridge | 370/343 |
| 2003/0023726 A1* | 1/2003 | Rice et al. | 709/225 |
| 2003/0236818 A1* | 12/2003 | Bruner | G01C 21/34 709/200 |
| 2004/0078139 A1 | 4/2004 | Kornhauser et al. | |
| 2004/0104842 A1 | 6/2004 | Drury et al. | |
| 2004/0162830 A1* | 8/2004 | Shirwadkar et al. | 707/10 |
| 2004/0203998 A1* | 10/2004 | Knauerhase | H04W 36/32 455/550.1 |
| 2004/0220730 A1* | 11/2004 | Chen | G01C 21/3407 701/414 |
| 2005/0004749 A1* | 1/2005 | Park | 701/200 |
| 2005/0009521 A1* | 1/2005 | Preece | 455/435.1 |
| 2005/0075116 A1* | 4/2005 | Laird | A61B 5/04 455/456.3 |
| 2005/0181810 A1* | 8/2005 | Camp et al. | 455/456.6 |
| 2005/0188051 A1* | 8/2005 | Sneh | 709/213 |
| 2005/0256781 A1 | 11/2005 | Sands et al. | |
| 2005/0288849 A1* | 12/2005 | Rothman | G08G 1/096716 701/117 |
| 2006/0058062 A1* | 3/2006 | Bhagwat et al. | 455/553.1 |
| 2006/0089152 A1* | 4/2006 | Mahonen | H04W 4/02 455/456.1 |
| 2006/0205402 A1* | 9/2006 | Banavar | H04W 76/19 455/426.1 |
| 2007/0088494 A1* | 4/2007 | Rothman | G08G 1/096716 701/532 |
| 2007/0143017 A1* | 6/2007 | Reich | G01C 21/26 701/469 |
| 2007/0225902 A1* | 9/2007 | Gretton et al. | 701/202 |
| 2010/0228478 A1* | 9/2010 | You | G01C 21/32 701/533 |

OTHER PUBLICATIONS

Drakoulis, D., Kyriazakos, S., Karetsos, G., "Improving subscriber position location using a hybrid satellite-assisted and network-based technique", Vehicular Technology Conference Fall 2000. IEEE VTS Fall VTC2000. 52nd Vehicular Technology Conference, Boston, MA, USA, Sep. 24-28, 2000.*

Summons to attend Oral Proceedings fr EP Application No. 06849001.0 dated Oct. 11, 2011.

* cited by examiner

INTELLIGENT LOCATION BASED SERVICES AND NAVIGATION HYBRID SYSTEM

FIELD OF INVENTION

The present invention relates generally to hybrid systems, and more particularly, to a system for a location based services and navigation system wherein a client and a server communicate to carry out the location based service and navigation tasks.

DESCRIPTION OF RELATED ART

Rapid growth in consumer electronics is evident with mobility as a ubiquitous feature. Consumer electronics products, such as music players, digital cameras, personal digital assistants (PDA), cellular phones, and notebooks, offer means for users to create, transfer, store, and consume information almost anywhere, anytime.

One consumer electronics growth, where mobility is quintessential, is in location based services, such as navigation systems utilizing satellite-based Global Positioning System (GPS) devices. Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest. The real-time information provides invaluable relevant information, when available or in service areas. The relevant information is also invaluable when service is not available, as well.

Currently, there are mainly two types of navigation system. One is client based navigation system. All map content and navigation software are stored on the client. And the client based navigation system can be specially designed standalone GPS navigation units, normally called Personal Navigation Device (PND), with large memory device to store maps on board; or using standard PDA or smart phone with memory card. The second one is thin client and server based navigation system. This is very typical of cell phone based navigation system. In this case, the map data and other Points of Interest (POI) data are stored at server. The map data is loaded to the phone to provide navigation service through the phone, each time its user requests the navigation service. The drawback of the client based navigation system is the inconvenience to get more updated maps. Also, it is more costly and typically larger in size since it needs larger memory card to store large amount of maps and POI data. Because of limitation of the memory card, and the large data size of the street audio prompts, the typical standalone navigation device does not provide audio street name prompts. The advantage is that it can be used in areas without wireless coverage, because it does not depend on wireless service as the thin client navigation system. The drawback of the thin client navigation system is that it always need wireless network to load the map information to the client to navigate. So when there is no network, the user is then unable to access the navigation service. The advantage of the thin client system is that its map data is always updated, because it can be done at server by the service provider, rather by users. Also the POI data can be updated as well from server. It can also provide other real time information to the thin client through wireless network, such as gas price or weather information. Also since all street audio prompts are stored at server, the thin client system can play audio street prompts, because they are loaded to the phone together with map and route information when the user requests the navigation services. A hybrid navigation system is needed to address above drawbacks of either client based system or thin client based system, and at the same time take advantage of the merits of both systems.

SUMMARY OF THE INVENTION

An intelligent location based services and navigation hybrid system is provided by partitioning the intelligence between the server and client devices to support off-line as well as on-line or real-time relevant information system comprising a server-client structure, wherein the relevant information functions are partitioned and executed by one or more distributed servers and location based service enabled client devices. The present invention provides an intelligent location based services and navigation system comprising a client having location based service capability and storing information capability and a server. The intelligent location based services and navigation system provides functions to set a condition for updates of a relevant information by the server and client (distributed and coordinated conditions), selects the relevant information for the updates by the server, transmits the relevant information from the server, receives the updates of the relevant information by the client, and selects an operational mode by the client and/or server.

The intelligent location based services and navigation hybrid system provides flexible, expansive, and robust real-time or on-line, as well as off-line relevant information to location based services enabled devices that have not been previously achieved. The client may intelligently request updates, or request entirely new type of information from the server as desired, receive the updates, or provide updates as well. The client may elect to operate off-line or on-line in areas with services to optimize interaction with the server. The client may utilize extended storage of the memory accessing vast amounts of relevant information as desired. The client can accumulate information received from the server and only update the information from server as needed. The client may also delete information based on the priorities to accommodate the limited storage size on the client. These priorities can be set either through client application but with the ability to be set through server as well. The client can also start with preloaded information through memory storage device either internal or external to the client. The server may also intelligently provide updates to the client based on predetermined intervals, event driven, or based on analysis by the server, such as travel routes leading the client to areas with no content to support that region.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments not necessarily enumerated herein. Thus, the present invention is not intended to be limited to the embodiments shown but is to be accorded the widest scope consistent with the principles and features described herein.

A key component of a navigation system is the determination of the navigation information (or position) of a user. It is intended that the term navigation information referred to herein comprises a geographic location or geographic information relating to the position of an object. The navigation information may contain three-dimensional information that completely defines the substantially exact position of an object. In some additional embodiments, the navigation information may contain information that is not sufficient to completely define the position of an object. Broadly defined, as used herein, the navigation information also may include speed, time, direction of movement, etc. of an object.

One skilled in the art would appreciate that the format with which a navigation information is expressed is not critical to some embodiments of the invention. For example, in some embodiments, navigation information is presented in the format of (x, y), where x and y are two ordinates that define the geographic location, i.e., a position of a user. In an alternative embodiment, navigation information is presented by longitude and latitude related information. In another embodiment of the present invention, the navigation information also includes a velocity element comprising a speed component and a heading component.

A key component of an intelligent location based services and navigation hybrid system is the relevant information for the user. It is intended that the term relevant information referred to herein comprises the navigation information described supra as well as information relating to points of interest to the user, such as local business, hours of businesses, types of businesses, advertised specials, traffic information, maps, local events, and nearby community or personal information etc.

Figure 1:
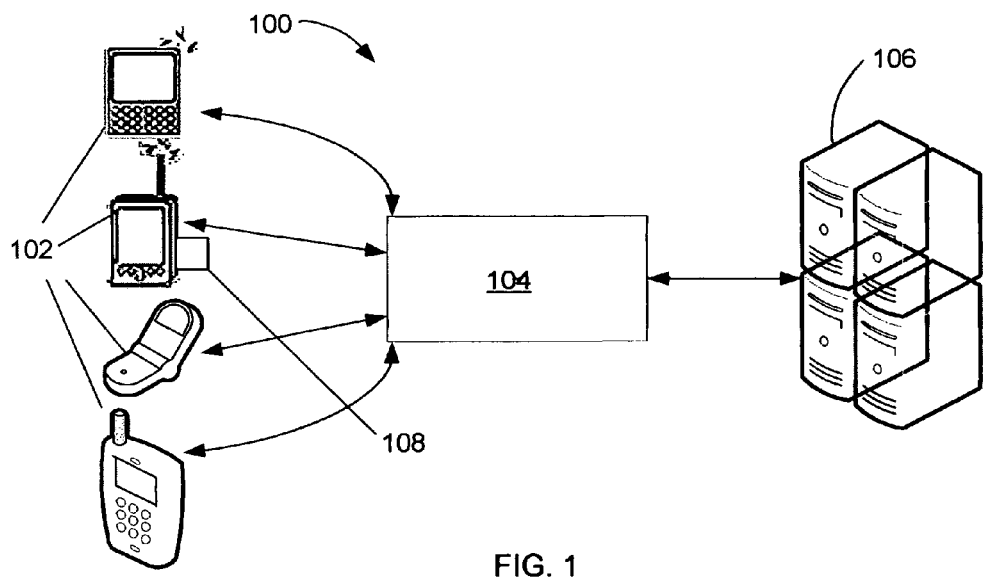
FIG. 1 is an architectural diagram of an intelligent location based services and navigation hybrid system in an embodiment of the present invention.

Referring now to FIG. 1, therein is shown an architectural diagram of an intelligent location based services and navigation hybrid system 100 in an embodiment of the present invention. The intelligent location based services and navigation hybrid system is provided by partitioning the intelligence between the server and client devices to support off-line as well as on-line or real-time relevant information system comprising a server-client structure, wherein the relevant information functions are partitioned and executed by one or more distributed servers and location based service enabled client devices. The architectural diagram depicts a client 102, such as location based service (LBS) enabled communication device, a communication path 104, and a server 106. The client 102 may be any number of locations based service communication device, such as a wireless personal digital assistant, smart phone, cellular phone, satellite phone, or integrated into vehicular telematic, all with capabilities to store information locally.

The processing intelligence of the intelligent location based services and navigation hybrid system 100 is partitioned with the server 106 and the client 102 with both having rules and logics to intelligently perform the respective functions. The functions in the client 102 and the server 106 for the intelligent location based services and navigation hybrid system 100 may be executed by software, firmware, hardware, or any combination thereof. The client 102 and the server 106 may independently or jointly control, update, and optimize the interaction, such as providing updates based on changing weather or traffic conditions or availabilities of the relevant information in the region client needs to operate or availabilities of the server access, with each other utilizing the communication path 104. The server 106 may also receive and analyze the relevant information from the client 102. For example, the server 106 may change the rules on the client 102, or change the parameters of the rules based on information from different sources relevant to the client 102. The server 106 may set logic for the interaction between the client 102 and the server 106, such as to obtain or set new parameters for the local rules. The client 102 may proactively interact with the server 106 utilizing the communication path 104. For illustrative purposes, the server 106 is shown as multiple units in a single location, although it is understood that the number of units of the server 106 and the locations of the server 106 may be distributed, as well.

Similarly, a distribution of the client 102 may proactively initiate transmission of real-time relevant information sampled or created by the distribution of the client 102, or may transmit stored relevant information from off-line operation of the distribution of the client 102 where no server access is available. The server 106 or the distribution of the server 106 may control, update, and optimize the interaction with the distribution of the client 102. For illustrative purposes, the server 106 or the distribution of the server 106 may interact with the client 102 or a distribution of the client 102, although it is understood that a portion of the distribution of the server 106 and the distribution of the client 102 may interact, as well. Also for illustrative purposes, the distribution of the server 106 and the distribution of the client 102 are shown to interact, although it is understood that a different or intersecting set of distribution of the server 106 and the client 102 may also interact, as well.

The server 106 may intelligently estimate possible travel directions of the client 102 and update the client 102 with predetermined relevant information when the client 102 may enter a no server access region or time, such as an area with no wireless network service. The server 106 may select a region, such as a particular geographic region, or a region surrounding the client 102, to sample and analyze the real-time relevant information from the client 102 in a service area. The server 106 may utilize sampled relevant information from the distribution of the client 102 in surrounding service areas of the no-service area improving the accuracy of the relevant information provided to the client 102. The server 106 may reconcile outlier samples from the distribution of the client 102 or to extrapolate relevant information in the no service area. The server 106 may intelligently increase the update rate or update on events, such as changing weather or traffic conditions, to the distribution of the client 102 improving relevant information accuracy.

For illustrative purposes, the server 106 is described as intelligently increasing update rate or update on event, although it is understood that the server 106 may provide other forms of controls and interactions to the distribution of the client 102, as well. Also for illustrative purposes, the interaction of the server 106 is described as between the server 106 and the distribution of the client 102, although it is understood the interaction may be to other elements of the intelligent location based services and navigation hybrid system 100, such as to another of the server 106 of the distribution of the server 106.

The client 102, having location based service capability, interacts with a navigation system, such as a Global Positioning System, of the communication path 104 for navigation information. The location based service may also include other information to assist the user of the client 102, such as local businesses and locations, traffic conditions, or other points of interest, which may adjust the travel route provided by the navigation system.

The client 102 comprises a control device (not shown), such as a microprocessor, software (not shown), a memory 108, cellular components (not shown), navigation components (not shown), and a user interface. The user interface, such as a display, a key pad, and a microphone, and a speaker, allows the user to interact with the client 102. The microprocessor executes the software and provides the intelligence of the client 102 for interaction with the server 106 for the relevant information, the user interface, interaction to the cellular system of the communication path 104, and interaction to the navigation system of the communication path 104, as well as other functions pertinent to a location based service communication device.

The memory 108, such as volatile, nonvolatile memory, internal only, externally upgradeable, or a combination thereof, may store the software, setup data, and other data for the operation of the client 102 as a location based service communication device. The memory 108 may also store the relevant information from the server 106 or preloaded, such as maps, route information, traffic information, and POI etc, and store the sampled or created relevant information to be transmitted to the server 106. For illustrative purpose, the functions of the client 102 may be performed by any one in the list of software, firmware, hardware, or any combination thereof. The cellular components are active and passive components, such as microelectronics or an antenna, for interaction to the cellular system of the communication path 104. The navigation components are the active and passive components, such as microelectronics or an antenna, for interaction to the navigation system of the communication path 104.

Figure 2:
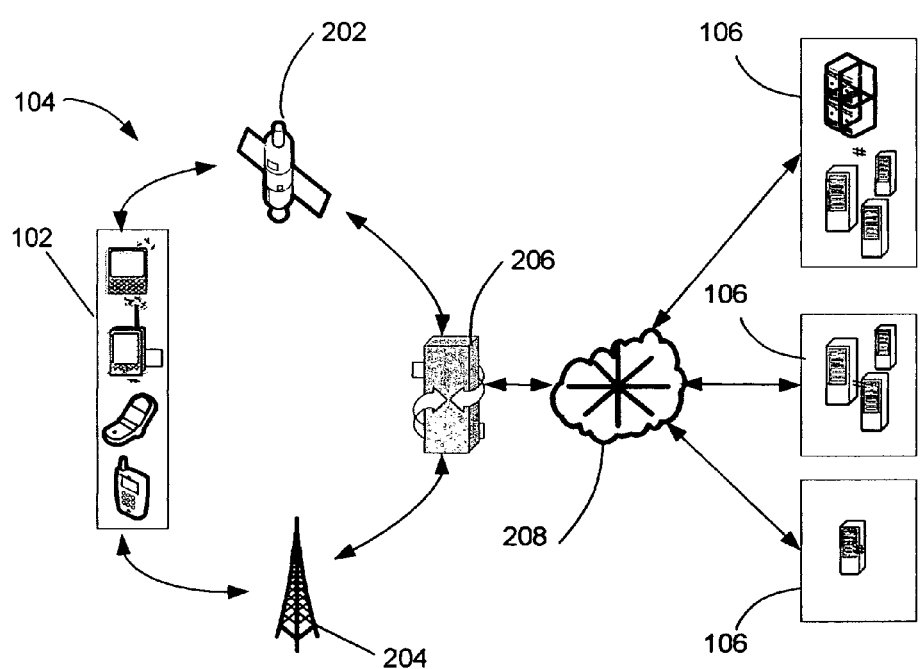
FIG. 2 is a more detailed architectural diagram of the communication path of FIG. 1.

Referring now to FIG. 2, therein is shown a more detailed architectural diagram of the communication path 104 of FIG. 1. The communication path 104 includes a satellite 202, a cellular tower 204, a gateway 206, and a network 208. The satellite 202 may provide the interaction path for a satellite phone form of the client 102 or may be part of the navigation system, such as Global Positioning System, to provide the interaction path for the client 102 with location based service capability. The satellite 202 and the cellular tower 204 provide an interaction path between the client 102 and the gateway 206. The gateway 206 provides a portal to the network 208 and subsequently the distribution of the server 106. The network 208 may be wired or wireless communication path and may include a local area network (LAN), a metropolitan area network (MAN), a wide area network (WAN), a storage area network (SAN), and other topological forms of the network 208, as required. The network 208 is depicted as a cloud of cooperating network topologies and technologies.

For illustrative purposes, the satellite 202 is shown as singular, although it is understood that the number of the satellite 202 may be more than one, such as a constellation of the satellite 202 to form navigation system interaction path, as well. Also for illustrative purposes, the cellular tower 204 is shown as singular, although it is understood that the number of the cellular tower 204 may be more than one, as well. Further for illustrative purposes, the gateway 206 is shown as singular, although it is understood that the number of the gateway 206 may be more than one, as well.

The interaction of the server 106 with the client 102 and with different locations of the distribution of the server 106 may traverse vast distances employing all of the elements of the communication path 104. The interaction may also utilize only a portion of the communication path 104. For illustrative purposes, the server 106 is shown connecting to the network, although it is understood that the server 106 may connect to other devices, such as another of the server 106 in the same location or storage.

Figure 3:
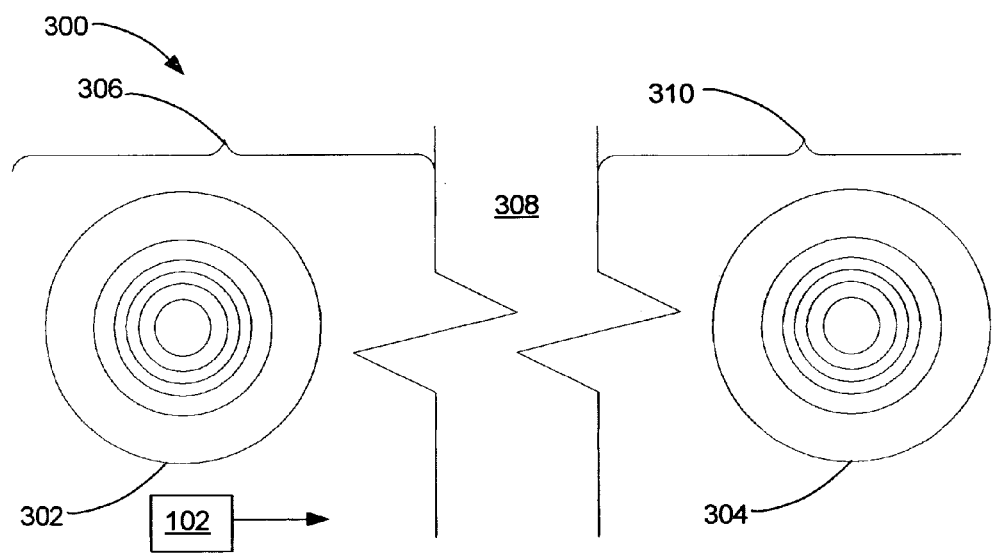
FIG. 3 is a diagrammatical view of geographic regions having no access to server.

Referring now to FIG. 3, therein is shown a diagrammatical view of geographic regions 300 having service and no-service. The diagrammatic view depicts an example of the client 102 traveling from left to right of the geographic regions 300 with first concentric circles 302 and second concentric circles 304 representing service. The client 102 travels from a first service region 306 then traverses a no server access region 308 and re-enters a second service region 310. For example, the geographic regions 300 from the first service region 306 to the second service region 310 may represent local and geographically adjacent regions or may be separated by large distances, such as from the west coast to the east coast of the United States of America. The no server access region 308 may be a geographic region with no physical server access, or may be a period when and where the client 102 is non-operative or operating in an off-line mode or the server is down The server 106 of FIG. 1 may provide updates to the client 102 traveling across the geographic regions 300. The updates may be at predetermined intervals, such as distance, or time, or may be event driven, such as traffic or weather condition changes. The server 106 may intelligently provide updates based on estimated travel path of the client 102 that may enter the no server access region 308. The server 106 may also intelligently update the client 102 based on analyzed relevant information of the first service region 306 and the second service region 310, such as unexpected changes between the first service region 306 and the second service region 310. The updates may be stored in the memory 108 of FIG. 1 of the client 102 to be used in the no server access region 308 or to minimize bandwidth utilization of the communication path 104 of FIG. 1 in areas with service. For example, if the user deviated from nominal route in the no server access region 308, the client can use local map either uploaded from the server or preloaded in the memory card and/or updated by the server, and/or traffic information, to provide local rerouting, which has been impossible for the thin client navigation system. When the client is in the second region 310 with service, the client will still use the local relevant information as long as they exist on the memory card and up to date. In the case the local relevant information, such as maps, is either not up to date or not available, on the memory card, then the client will request to the server to get the updated relevant navigation information, such as maps, and POI information. After each use, the client will decide to either accumulate the information on the client or just delete them, based on the logic set by either server or client.

For illustrative purpose, the client 102 is shown as singular, although it is understood that the client 102 may be a distribution of the client 102. Also for illustrative purpose, the client 102 is shown as traveling from left to right across the geographic regions 300, although the client 102 may travel in any direction. Further for illustrative purpose, the server 106 may utilize the relevant information from the first service region 306 and the second service region 310 to update the client 102 prior to entering the no server access region 308, although it is understood that the server 106 may utilize other relevant information other than from the first service region 306 or the second service region 310 providing appropriate updates to the client 102. The client 102 may subsequently transmit the sampled, stored, or relevant information created during the no server access region 308, such as in a geographic region with service, when the client 102 is operative, or when the client 102 proactively operates in an on-line mode in the second region 310.

The client 102 may proactively request for updates from the server 106 or sync with the information at the server 106, based on rules defined at client. The rules or part of the rules can be updated from server as well. For example, the client 102 may have relevant information indicating possible non-operative periods, such as air travel requiring the client 102 to be turned off. The client 102 may intelligently track non-operative events or time and request updates as appropriate or as needed. The non-operative times or events may not be prescheduled and the client 102 may request updates from the server 106 when the client 102 is turned back on. The client 102 may also proactively request for updates from the server 106 determined by the usefulness of the relevant information in the client 102, such as age of the information, different geographic locations, or updating selected relevant information based on priority rules that may be included in the client 102. The relevant information updates in the client 102 may override, replace, or add to the existing relevant information in the client 102. The client 102 may also request for more information from the server 106, if the user upgrade its memory card for the client 102 from a smaller to a larger memory size.

Figure 4:
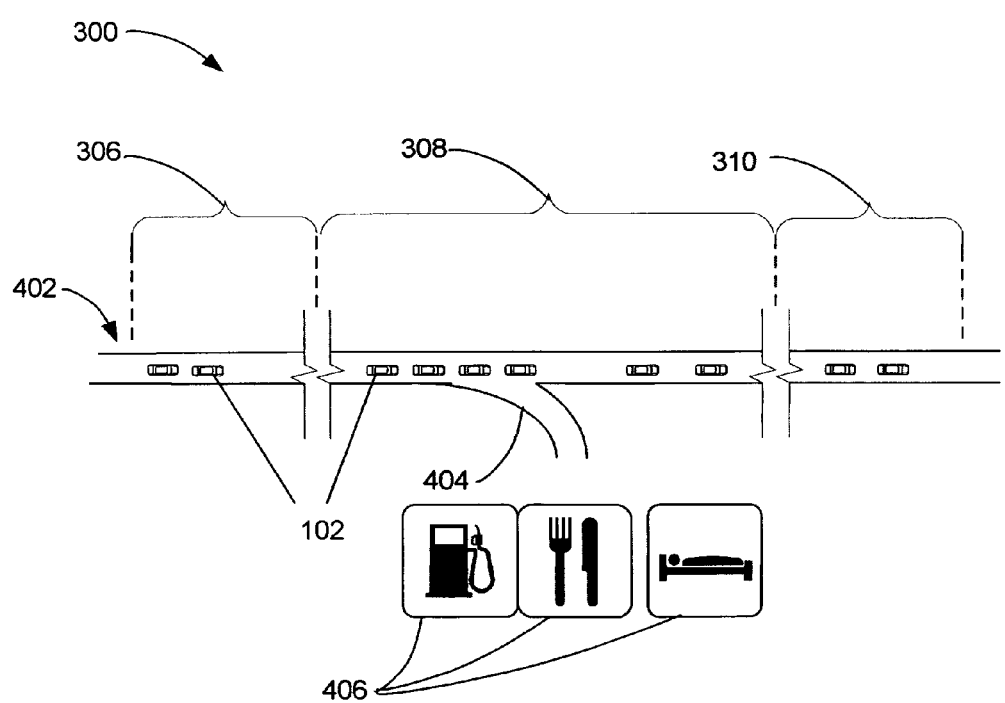
FIG. 4 is a more detailed diagrammatical view of the geographic regions of FIG. 3 with the relevant information stored on the distribution of the client.

Referring now to FIG. 4, therein is a more detailed diagrammatical view of the geographic regions 300 of FIG. 3 with the relevant information stored on the distribution of the client 102. The more detailed diagrammatic view depicts the geographic regions 300 as an aerial representation of a roadway segment 402 with a distribution of the client 102 traveling generally from left to right across the first service region 306, the no server access region 308, and the second service region 310. The no server access region 308 has an exit 404 leading to various points of interest 406, such as gas station, restaurants, or hotels.

The server 106 of FIG. 1 may update the distribution of the client 102 in the predetermined interval or as a result of analysis of the travel paths of the distribution of the client 102 traveling towards the no server access region 308, or as a result of the content change from the server 106, such as new map data update, or traffic condition change due to special event such as big sport event The client 102 may request updates to the points of interest 406.

The server 106 may analyze the relevant information from the first service region 306, the second service region 310, and other sources determining no significant change in traffic flow across the geographic regions 300 such that the server 106 may not update relevant information to the distribution of the client 102 to optimize the interaction between the server 106 and the distribution of the client 102. The travel routes, estimated times, and other relevant information for the distribution of the client 102 traveling through the no server access region 308 should be accurate and stored in the distribution of the client 102 or a portion of the distribution of the client 102 that may store the relevant information. The memory 108 of FIG. 1 of the client 102 provides the user the location based services information and navigation information for the no server access region 308. The information should be as sufficient as possible to conduct all core navigation services, such as automatic deviation correction, and general POI or personalized POI search.

Alternatively, as an example, the client 102 may obtain updates in the no server access region 308, such as access to a wired service, electrical or optical, such as a wired broadband service. For example, the client 102 may take the exit 404 and stop by one of the points of interest 406 having wired service access. The client 102 may obtain updates at or near the points of interest 406 by direct connect to a wired service terminal (not shown), such as a personal computer, or wireless if the wired service is connected to a wireless service, such as wireless local area network (WLAN) or Wi-Fi. These updates may modify to the relevant information in the other regions outside of the no server access region 308 affecting travel routes, estimated times, or the distance to the next availability of the points of interest 406. The client 102 may utilize a wired service in the no server access region 308 to provide updates to the server 106 as well, such as review of the local restaurants.

For illustrative purpose, the distribution of the client 102 is shown traveling in a unidirection from left to right on the roadway segment 402, although it is understood that the distribution of the client 102 may travel in any number of direction. Also for illustrative purpose, the exit 404 is shown leading to the points of interest 406 in the no server access region 308, although it is understood the exit 404 may lead to an area with service. The user can also exit through 404 by mistake and hence deviate from the nominal route.

Figure 5:
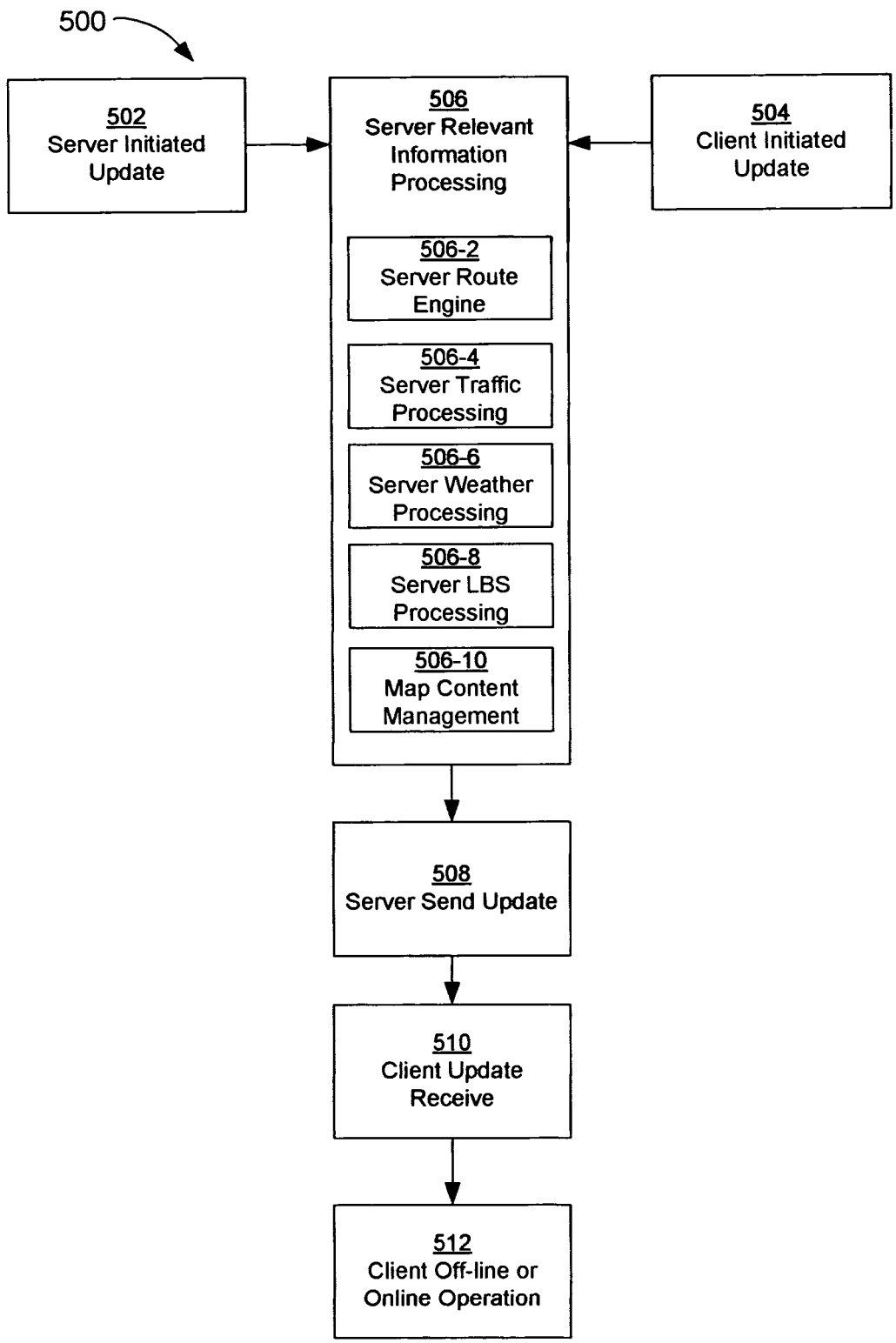
FIG. 5 is a flow chart for a processing flow in the server and client of the relevant information.

Referring now to FIG. 5, therein is shown a flow chart for a processing flow 500 in the server and client of the relevant information. The intelligent location based services and navigation hybrid system 100 may update the client with relevant information in a number of different ways. A server initiated update 502 may invoke updates of the relevant information to the client 102 by a periodic time or distance interval for the client 102 predetermined by the server 106 or may be updated based on events, such as changes to weather conditions or traffic flow, causing changes to the relevant information or when the information on the server get updated from its sources, such as map vendors or POI vendors or from other user feedbacks. A client initiated update 504 may invoke updates of the relevant information when the client 102 requests the server 106 for updates of the relevant information, for example when the client get service request from the users, but the relevant information is not available on the client, or when the client decide that the data on the client is obsolete already Both the server initiated update 502 and the client initiated update 504 are processed by the server 106 in a server relevant information processing 506 utilizing the predetermined functions, such as a server route engine 506-2, map data content management module 506-10, a server traffic processing 506-4, a server weather processing 506-6, or a server location based services (LBS) processing 506-8. The server 106 may utilize various feeds, such as weather, traffic, or location based services database or wireless service coverage map, and to analyze the relevant information that needs to be updated and/or the aging information of the information on the client to optimize the interaction between the server 106 and the client 102.

The server relevant information processing 506 provides the appropriate relevant information to a server send update 508 for transmission to the client 102. The client 102 receives the relevant information updates with a client update receive 510. The client 102 determines whether to store the information in the memory 108 of FIG. 1 or update appropriate subset of the relevant information for the user of the client 102, such as updating the local map data content, or the display on travel routes or estimated travel times. A client off-line or on-line operation 512 determines if the client 102 will operate off-line with the stored relevant information to optimize interaction with the server 106 or in areas without service, or if the client 102 will operate on-line for maximum update or if the memory 108 does not have sufficient space or the service requires to access real time information from the server.

The server send update 508 is not isolated to provide updates directly to the client 102. The server 106 may provide updates to other destinations, such as the wired terminals or other feeds, for the client 102 to direct connect and update in areas of no service, to optimize the interaction to the server 106, or to store vast amount of the relevant information on a number of the memory 108.

The intelligent location based services and navigation hybrid system 100 may be executed with circuitry, software, or combination thereof. The processing flow 500 may be executed with circuitry, software, or combination thereof.

It has been discovered that the intelligent location based services and navigation hybrid system 100 provides flexible, user friendly, high performance, expansive, and robust real-time or on-line as well as off-line relevant information to location based services enabled devices that have not been previously achieved. The server 106 may intelligently provide updates to the client 102 based on predetermined intervals, event driven, or based on analysis by the server 106, such as travel routes leading the client 102 to areas with no-service or map information updates from its vendor. The client 102 may intelligently request updates from the server 106 as desired, receive the updates, or provide updates as well. The client 102 may elect to operate off-line or on-line in areas with services to optimize interaction with the server 106. The client 102 may utilize extended storage of the memory 108 accessing vast amounts of relevant information as desired.

Figure 6:
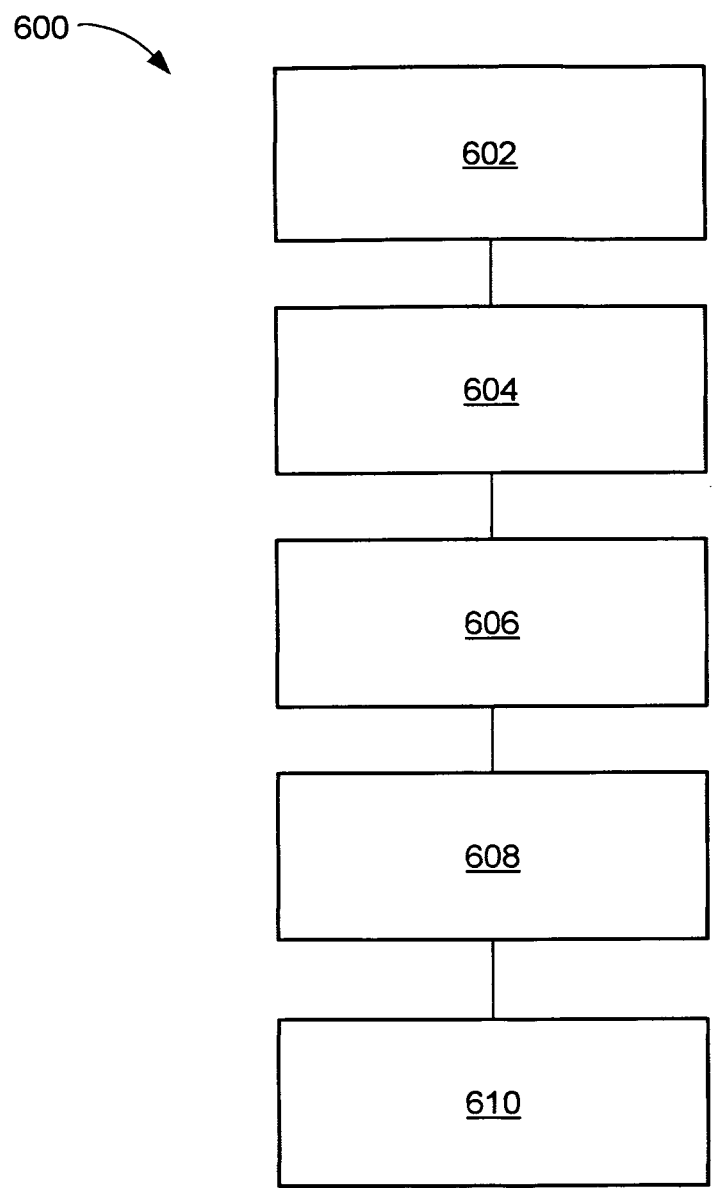
FIG. 6 is a flow chart of the intelligent located based services and navigation hybrid system in an embodiment of the present invention.

Referring now to FIG. 6, therein is shown flow chart of an intelligent location based services and navigation hybrid system 600 for manufacturing the intelligent location based services and navigation hybrid system in an embodiment of the present invention. The system 600 comprising a client having location based service capability and a server includes setting a condition for updates of a relevant information by the server in a block 602; selecting the relevant information for the updates by the server in a block 604; transmitting the relevant information from the server in a block 606; receiving the updates of the relevant information by the client in a block 608; and selecting an operational mode by the client in a block 610.

While the invention has been described in conjunction with a specific best mode, it is to be understood that many alternatives, modifications, and variations will be apparent to those skilled in the art in light of the above description. Accordingly, it is intended to embrace all such alternatives, modifications, and variations, which fall within the scope of the included claims. All matters set forth herein or shown in the accompanying drawings are to be interpreted in an illustrative and non-limiting sense.

We claim:

1. An intelligent location based services and navigation hybrid method with a client having location based service capability and a server comprising:
    setting a condition for updates of relevant information based on client defined rules including updates prior to when the client enters a no server access region based on sampled relevant information including navigation and point of interest information in surrounding service areas of the no server access region;
    selecting the relevant information for the updates by the server or the client, or a combination thereof;
    transmitting the relevant information from the server or the client;
    receiving the updates of the relevant information by the server or the client; and
    selecting an operational mode by the client.

2. The method as claimed in claim 1 wherein setting the condition for the updates of the relevant information by the server or client, or a combination thereof, comprises setting an interval to send the updates from the server or client.

3. The method as claimed in claim 1 wherein setting the condition for the updates of the relevant information by the server or client, or a combination thereof comprises setting event conditions for the server or client to send the updates.

4. The method as claimed in claim 1 wherein determining the operational mode by the client comprises determining an on-line or off-line operation of the client.

5. The method as claimed in claim 1 wherein selecting the relevant information for the updates by the server or client comprises determining a portion of the relevant information for optimization of the updates provided by the server or client.

6. An intelligent location based services and navigation hybrid method with a client having location based service capability and a server comprising:
    setting a condition for updates of relevant information based on client defined rules including updates prior to when the client enters a no server access region based on sampled relevant information including navigation and point of interest information in surrounding service areas of the no server access region;
    requesting the updates for the relevant information by the server or the client;
    selecting the relevant information for the updates by the server or the client;
    transmitting the relevant information from the server or the client;
    receiving the updates of the relevant information by the server or the client;
    determining storage of the updates of the relevant information received by the client; and selecting an operational mode as an on-line or off-line mode by the client.

7. The method as claimed in claim 6 wherein receiving the updates of the relevant information by the server or client comprises connecting a wired terminal to the client.

8. The method as claimed in claim 6 wherein transmitting the relevant information from the server or client comprises utilizing a communication path for the transmission of the updates of the relevant information.

9. The method as claimed in claim 6 wherein determining the storage of the updates of the relevant information received by the client comprises selectively storing the relevant information to a memory by the client.

10. The method as claimed in claim 6 wherein selecting the operational mode as on-line or off-line by the client comprises utilizing a memory of the client with the relevant information stored for off-line operation.

11. An intelligent location based services and navigation hybrid system with a client having location based service capability and a server comprising:
   a control circuitry within the server or the client for setting conditions for updates of relevant information based on client defined rules including updates prior to when the client enters a no server access region based on sampled relevant information including navigation and point of interest information in surrounding service areas of the no server access region;
   a selection circuitry within the server or the client for selecting the relevant information for the updates by the server or client;
   a transmission circuitry within the server or the client for controlling the transmission of relevant information from the server or the client;
   an update circuitry within the server or client for controlling the updates of the relevant information received by the server or the client; and
   a mode select circuitry within the client for selecting an operational mode of the client.

12. The system as claimed in claim 11 wherein the control circuitry within the server or client for setting condition for the updates of the relevant information further comprises an interval setting circuitry for setting an interval to send the updates from the server.

13. The system as claimed in claim 11 wherein the control circuitry within the server or client, or a combination thereof, for setting condition for the updates of the relevant information further comprises an event setting circuitry for setting event conditions to for the server or client to send the updates.

14. The system as claimed in claim 11 wherein the mode select circuitry within the client comprises an on-line or off-line operation of the client.

15. The system as claimed in claim 11 wherein the selection circuitry within the server or client comprises selection optimization circuitry for selecting a portion of the relevant information as the updates provided by the server.

16. The system as claimed in claim 11 wherein the mode select circuitry within the client further comprises data storage for storing the updates of the relevant information received by the client.

17. The system as claimed in claim 11 wherein the update circuitry within the server or client further comprises an interface circuitry for connecting to a wired service provider to receive the relevant information.

18. The system as claimed in claim 11 further comprising a communication path between the server and the client for transmitting the updates of the relevant information between the server and client.

19. The system as claimed in claim 16 wherein the mode select circuitry within the client comprises a data selection circuitry for selectively storing the updates of the relevant information received by the client in the data storage of the client.

20. The system as claimed in claim 16 wherein the data storage provides memory for the relevant information during an off-line operation of the client.

* * * * *